Dec. 31, 1929.   W. H. PIERCE   1,742,169
FASTENER
Filed Nov. 18, 1924
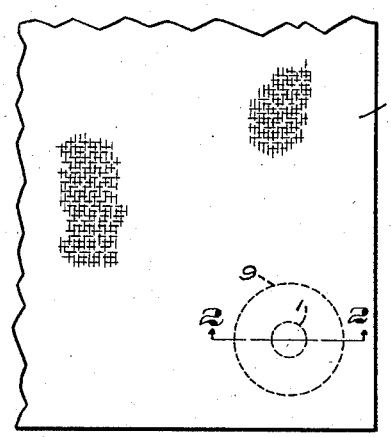
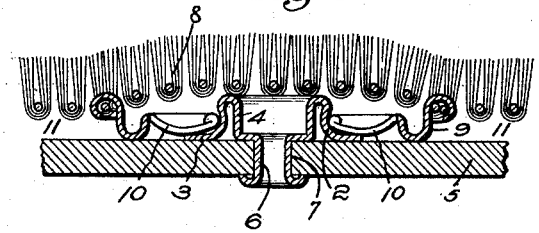
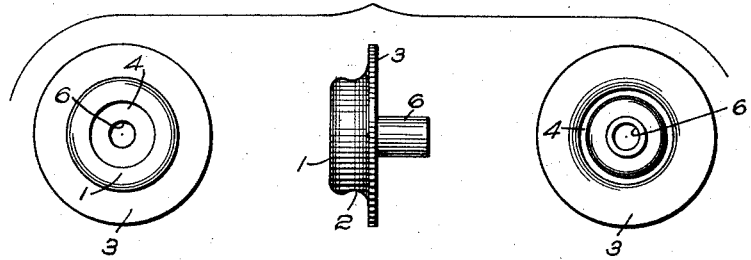
Inventor:
Walter H. Pierce.
by Emery Booth Janney Varney
Attys.

Patented Dec. 31, 1929

1,742,169

UNITED STATES PATENT OFFICE

WALTER H. PIERCE, OF WATERTOWN, MASSACHUSETTS, ASSIGNOR, BY MESNE ASSIGN-MENTS, TO UNITED-CARR FASTENER CORPORATION, OF CAMBRIDGE, MASSACHU-SETTS, A CORPORATION OF MASSACHUSETTS

FASTENER

Application filed November 18, 1924. Serial No. 750,597.

This invention aims to provide an improved separable fastener.

In the drawings, which illustrate a preferred embodiment of my invention:—

Figure 1 is a plan view of a portion of a carpet showing the underlying fastener in dotted lines;

Fig. 2 is an enlarged section on the line 2—2 of Fig. 1; and

Fig. 3 includes a front, a side and a rear elevation of the stud.

Referring to the drawings, I have shown a fastener which is particularly, though not exclusively, useful for securing rugs, carpets and the like to floors, particularly metal floors.

The stud, as illustrated, is pressed from a single piece of metal and includes a head 1, a neck 2, a base flange 3 and a central depression 4 in the head 1. The stud may be secured to any suitable support in any convenient manner, but I prefer to secure it to a metal floor 5 by a tubular rivet 6. This rivet is preferably pressed from the metal forming the bottom portion of the depression in the head which is substantially in the same plane as the base flange 3. To secure the stud to the floor 5, I first insert the tubular rivet 6 through an aperture 7 in the floor 5 and then "head" the rivet against the opposite face of the metal floor 5, as illustrated in Fig. 2. Thus the stud is secured in position upon the floor of an automobile, room or the like, and may cooperate with a socket located on a carpet 8, to secure the carpet in position relative to the floor.

Any suitable socket having resilient stud-engaging means may be used to cooperate with the above-described stud. I prefer, however, to use a socket 9 similar to the one illustrated in Fig. 2, and more fully illustrated and described in United States patent to Fred S. Carr No. 1,535,983, issued April 28, 1925.

This socket is pressed from a single piece of metal and has a stud-receiving aperture surrounded by a plurality of resilient fingers 10 for engagement with the neck of the stud. The socket 9 (Fig. 2) is secured to the carpet 8 by a plurality of attaching prongs 11 which engage the web of the carpet as illustrated.

While I have shown and described a preferred embodiment of my invention, it will be understood that I have done so for purposes of clarification and not for limitation, my invention being best defined in the following claim.

Claim:

A fastener stud installation comprising, in combination, a relatively thin rigid supporting structure having a pre-formed hole therethrough, a one-piece snap fastener stud superposed upon said support and having a base seated against one face thereof, a head and a neck extending upwardly from said base, a central depressed cup-shaped portion formed in said head, said cup-shaped portion having its base seated against said support and an integral tubular rivet extending from the base of said cup-shaped portion through the hole in the supporting structure and having its free end upset against the opposite side of the supporting structure to secure the stud in position.

In testimony whereof, I have signed my name to this specification.

WALTER H. PIERCE.